(12) United States Patent
Ikeda et al.

(10) Patent No.: US 7,832,439 B2
(45) Date of Patent: Nov. 16, 2010

(54) PNEUMATIC TIRE HAVING RECESS IN BUTTRESS FACE

(75) Inventors: Akio Ikeda, Kobe (JP); Naoki Kageyama, Kobe (JP); Masaki Terashima, Kobe (JP); Noriko Kishimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 308 days.

(21) Appl. No.: 12/073,428

(22) Filed: Mar. 5, 2008

(65) Prior Publication Data

US 2008/0223495 A1 Sep. 18, 2008

(30) Foreign Application Priority Data

Mar. 15, 2007 (JP) .............................. 2007-067048

(51) Int. Cl.
*B60C 11/01* (2006.01)
*B60C 11/12* (2006.01)
(52) U.S. Cl. ........................... 152/209.16; 152/209.27; 152/DIG. 3
(58) Field of Classification Search ............ 152/209.16, 152/209.27, DIG. 3
See application file for complete search history.

(56) References Cited

U.S. PATENT DOCUMENTS

| | | | |
|---|---|---|---|
| 3,818,964 A * | 6/1974 | Maiocchi ............... | 152/209.16 |
| 4,736,783 A | 4/1988 | Motomura et al. | |
| 4,957,149 A | 9/1990 | Iuchi et al. | |
| 4,977,942 A | 12/1990 | Ochiai et al. | |
| 4,993,466 A * | 2/1991 | Ochiai ................... | 152/209.16 |
| 5,010,936 A * | 4/1991 | Numata et al. ......... | 152/209.16 |
| 5,355,922 A * | 10/1994 | Kogure et al. .......... | 152/209.18 |
| 5,605,588 A | 2/1997 | Hatakenaka et al. | |

(Continued)

FOREIGN PATENT DOCUMENTS

EP 0 319 860 A2 6/1989

(Continued)

OTHER PUBLICATIONS

Machine translation for Japan 2007-161135 (no date).*

(Continued)

*Primary Examiner*—Steven D Maki
(74) *Attorney, Agent, or Firm*—Birch, Stewart, Kolasch & Birch, LLP

(57) ABSTRACT

A pneumatic tire capable of preventing wandering without impairing wear resistance, including tread portion 2 having circumferential shoulder grooves 6c extending at locations near ground contact edges E and lateral shoulder grooves 7d extending between circumferential groove 6c and ground contact edge E, and having square shoulders such that tread surface 2a and buttress face 14 extending radially inwardly and axially outwardly from ground contact edge E intersects to form an edge or corner, wherein each shoulder block B4 is provided with circumferential sipe 11 in a region apart axially inwardly from ground contact edge E by a distance of 2 mm or more and a distance of 10 mm or less, the buttress face 14 is provided with recess 15 extending circumferentially in at least a part of projection region Z obtained by projecting circumferential sipe 11 onto buttress face 14, and radially innermost end 15B of recess 15 is located at a radial position corresponding to a region ranging from 50 to 100% of the depth of circumferential sipe 11.

4 Claims, 7 Drawing Sheets

U.S. PATENT DOCUMENTS

| | | | | |
|---|---|---|---|---|
| 5,800,642 | A | * | 9/1998 | Ohya .................. 152/209.1 |
| 6,102,093 | A | * | 8/2000 | Nakagawa ............ 152/DIG. 3 |
| 6,488,064 | B1 | | 12/2002 | Radulescu et al. |
| 2008/0173380 | A1 | * | 7/2008 | Ohara .................. 152/209.16 |

FOREIGN PATENT DOCUMENTS

| | | | | |
|---|---|---|---|---|
| EP | 0 364 142 | A2 | | 4/1990 |
| JP | 2 053606 | | | 2/1990 |
| JP | 04-043103 | A | | 2/1992 |
| JP | 04-232104 | | * | 8/1992 |
| JP | 06-024211 | | * | 2/1994 |
| JP | 6 087303 | | | 3/1994 |
| JP | 6-87303 | A | | 3/1994 |
| JP | 06-087303 | A | | 3/1994 |
| JP | 6 316204 | | | 11/1994 |
| JP | 06-316204 | | * | 11/1994 |
| JP | 09-193616 | | * | 7/1997 |
| JP | 10 035223 | | | 2/1998 |
| JP | 10-138713 | A | | 5/1998 |
| JP | 2000-233606 | A | | 8/2000 |
| JP | 2007-161135 | | * | 6/2007 |
| JP | 2007-174112 | | | 7/2007 |

OTHER PUBLICATIONS

Machine translation for Japan 09-193616 (no date).*
Machine translation for Japan 06-316204 (no date).*
Machine translation for Japan 06-024211 (no date).*
Derwent abstract for 04-232194 (no date).*

* cited by examiner

PNEUMATIC TIRE HAVING RECESS IN BUTTRESS FACE

BACKGROUND OF THE INVENTION

The present invention relates to a pneumatic tire suitable for traveling on icy and snow-covered roads, and more particularly to a pneumatic tire capable of effectively preventing wandering without impairing the wear resistance.

Pneumatic tires suitable for traveling on icy and snow-covered roads, including for example studless tires, usually have a square shoulder. In a square shoulder, as shown by a solid line in FIG. 7, an outer surface "a" of a shoulder block and a buttress face "b" extending radially inwardly and axially outwardly intersects at a ground contact edge "e" to form a substantial edge (corner). The term "substantial edge" means that the "square shoulder" encompasses a shoulder such that the ground contact edge "e" (corner "e") is chamfered in the form of, for example, a small arc having a radius of about 2.0 mm or less. Such a tread portion can secure a large ground contact width TW and, therefore, a sufficient driving force can be obtained on an icy road. An example of the profile line of a round shoulder is shown in FIG. 7 by an imaginary line (dashed-two dotted line).

When traveling on a rutted road, pneumatic tires having square shoulders are easy to cause a so-called wandering phenomenon that a tire wanders by an external force or the like received from a road, since the ground contact edge "e" or a part of the buttress face "b" near the edge "e" comes into contact with a slope of a rut. Pneumatic tires capable of suppressing such a wandering are proposed, for example, in JP-A-6-087303 and JP-A-10-138713, but they leave room for improvement in wear resistance.

Accordingly, it is an object of the present invention to provide a pneumatic tire capable of suppressing occurrence of wandering phenomenon without impairing the wear resistance.

This and other objects of the present invention will become apparent from the description hereinafter.

SUMMARY OF THE INVENTION

In accordance with the present invention, there is provided a pneumatic tire comprising a tread portion having a pair of rows of shoulder blocks which are defined by a pair of circumferential shoulder grooves, each extending continuously in the circumferential direction of tire on a ground contact edge side, and a plurality of lateral shoulder grooves extending from said circumferential shoulder grooves to ground contact edges, and which are aligned along each of said ground contact edges, wherein said pneumatic tire has a square shoulder such that the outer surface of said shoulder blocks and a buttress face extending radially inwardly and axially outwardly from each of said ground contact edges intersects at each of said ground contact edges to form a substantial edge, and wherein each of said shoulder blocks is provided with a circumferential sipe extending in the circumferential direction in a region apart axially inwardly from each of said ground contact edges by a distance of 2 mm or more and a distance of 10 mm or less, said buttress face is provided with a recess extending in the circumferential direction and having a depth of 0.5 to 3 mm measured from said buttress face in at least a part of a projection region obtained by projecting said circumferential sipe onto said buttress face along the axial direction, and the radially innermost end of said recess is located at a radial position corresponding to a region ranging from 50 to 100% of the depth of said circumferential sipe.

In a meridian section including a rotation shaft of a tire in an unloaded standard state that the tire is mounted on a standard rim and inflated to a normal inner pressure, the recess has, for example, an approximately triangular cross section comprising a vertical plane extending from the buttress face in a radially inward direction at an angle within the range of ±10° with respect to the radial direction, a horizontal plane located radially inward of the vertical plane and extending from the buttress face in an axially inward direction at an angle within the range of ±10° with respect to the axial direction, and an arc plane joining the vertical and horizontal planes with a smooth arc.

In an embodiment of the present invention, the buttress face includes an outer slope extending radially inwardly and axially outwardly from the ground contact edge, a middle slope which is continuous with the outer slope and extends axially inwardly with an inclination smaller than that of the outer slope, and an inner slope which is continuous with the middle slope and extends approximately parallel to the outer slope, and the recess is provided in the middle slope.

Preferably, the circumferential sipe is located in a shoulder block without opening to the adjacent lateral shoulder grooves at its both ends.

Preferably, the recess has a circumferential length larger than that of the circumferential sipe and is located in the buttress face so that the both ends of the recess do not open to the adjacent lateral shoulder grooves and each end thereof is located between an end of the circumferential sipe and the lateral shoulder groove located on this sipe end side.

According to the pneumatic tire of the present invention, the rigidity of portions in the vicinity of the ground contact edges of the tread portion is suppressed low by the circumferential sipes and the recesses disposed in the buttress face. In the case that the ground contact edges and so on come into contact with a slope of a rut, usually a lateral force to go up the slope acts on the shoulder blocks by an action similar to camber thrust. However, since a portion located axially outward of the circumferential sipe disposed in a shoulder block can flexibly deforms axially outwardly with the recess as a fulcrum, the lateral force can be allowed to escape without being transmitted to the entire tire, so the anti-wandering performance is enhanced. Moreover, since the recesses have a limited depth and the axially inner ends of the recesses are located at a radial position corresponding to a region of 50 to 100% of the depth of the circumferential sipe, the recesses serve to exhibit a flexible deformation action as mentioned above without excessively lowering the rigidity of portions near the edges of the shoulder blocks, thus enhancing the wear resistance of the shoulder blocks.

DETAILED DESCRIPTION OF THE INVENTION

An embodiment of the present invention will now be explained with reference to the accompanying drawings.

Figure 1:
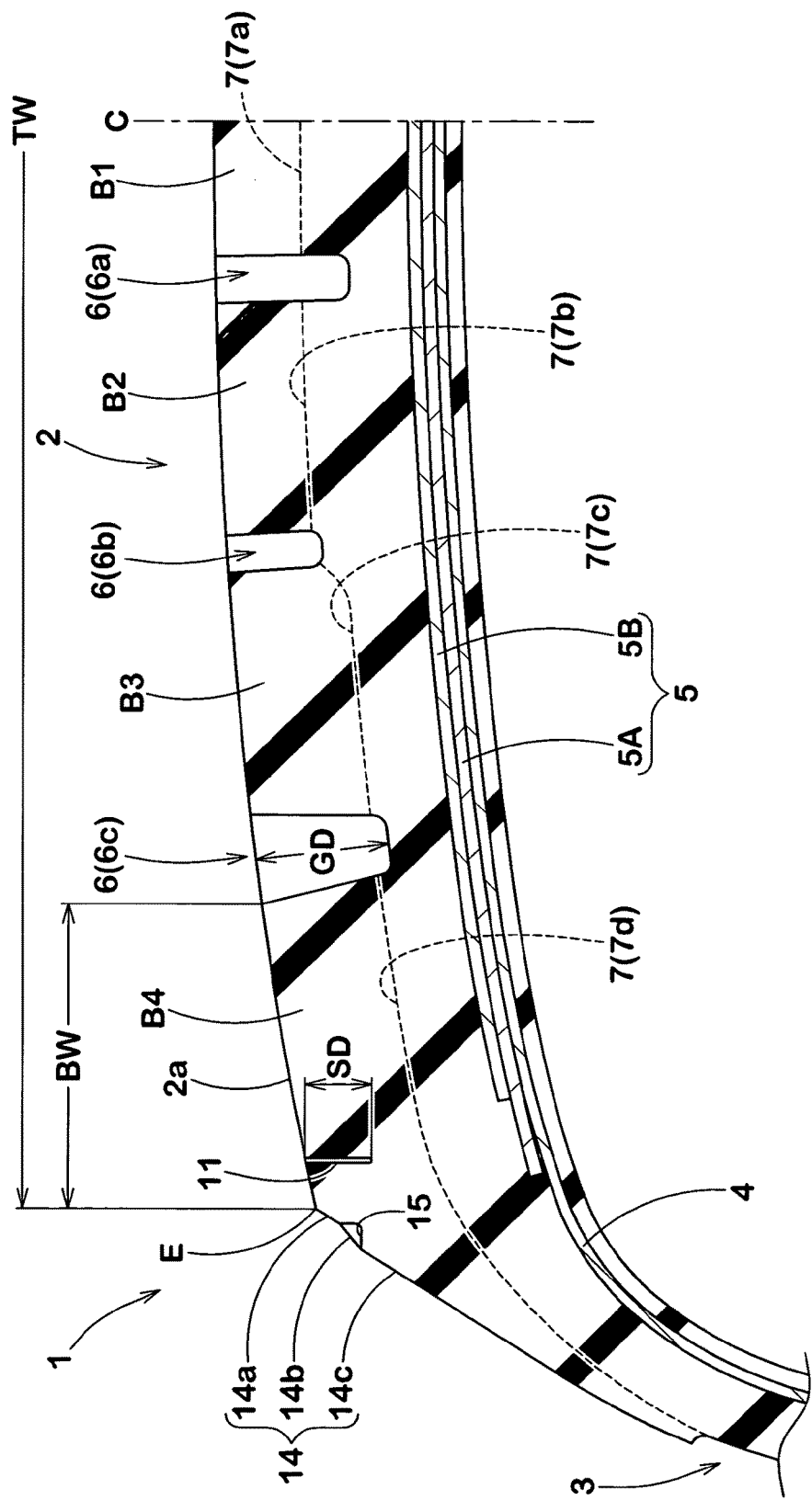
FIG. 1 is a cross sectional view of the left half of a pneumatic tire illustrating an embodiment of the present invention.

FIG. 1 is a view of meridian section including a tire rotation shaft of a pneumatic tire according to an embodiment of the present invention in which a tire 1 is in an unloaded standard state that the tire 1 is mounted on a standard rim (not shown) and inflated to a normal inner pressure, but no load is applied thereto. Herein, the dimensions of respective parts or portions of a tire denote values measured in the standard state, unless otherwise noted.

The term "standard rim" denotes a rim defined for every tire in a standardizing system on which the tire is based and is, for example, "standard rim" in JATMA, "Design Rim" in TRA and "Measuring Rim" in ETRTO. The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in "ETRTO", provided that in case of tires for passenger cars, the "normal inner pressure" is 180 kPa.

Figure 2:
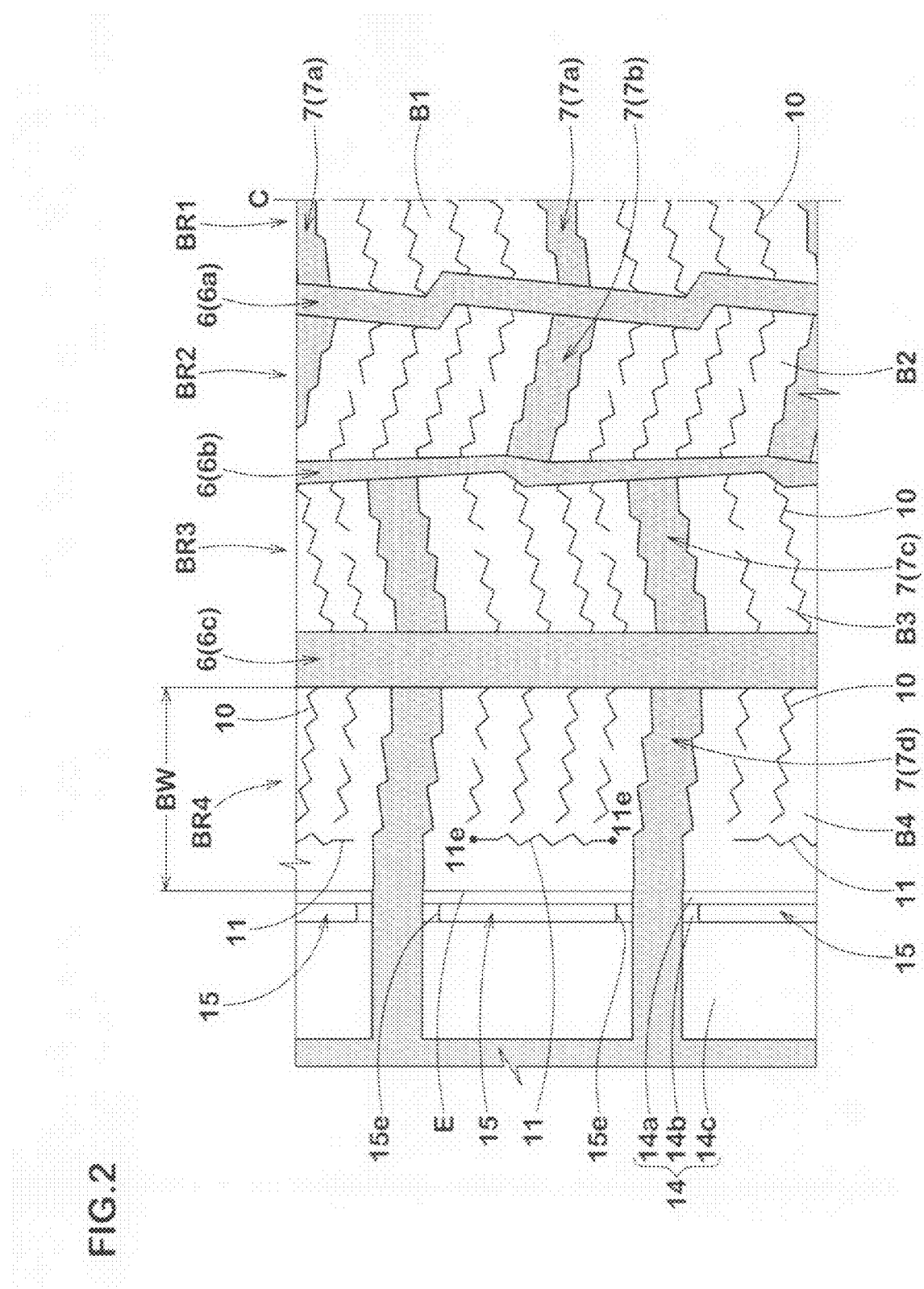
FIG. 2 is a partial development of a tread patter of the tire shown in FIG. 1.

Pneumatic tire 1 include, as shown in FIGS. 1 and 2, a tread portion 2, a pair of sidewall portions 3, 3 radially inwardly extending from both edges of the tread portion 2, and a pair of bead portions (not shown) which are disposed radially inward of the sidewall portions and are continuous with them. The tire 1 shown in this embodiment is a studless tire for passenger cars. The tire 1 is reinforced by a carcass 4 comprising organic fiber cords and extending in a toroidal form, and a belt layer 5 which is disposed inside the tread portion 2 and radially outward of the carcass 4 and is composed of, for example, two plies of steel cord belt 5A and 5B.

Tread portion 2 is provided with a plurality of circumferential grooves 6 extending continuously in the circumferential direction of tire and a plurality of lateral grooves 7 extending in a direction intersecting the circumferential grooves 6. These circumferential and lateral grooves 6 and 7 can exhibit a drainage performance and a snow-expelling performance.

The circumferential grooves 6 include, for instance, a pair of center circumferential grooves 6a, 6a which are disposed in the vicinity of the tire equator C and extend on the both sides of the tire equator C, a pair of middle circumferential grooves 6b, 6b disposed axially outward of the center grooves 6a, 6a, and a pair of shoulder circumferential grooves 6c, 6c which are disposed axially outward of the middle grooves 6b, 6b and extend circumferentially on a side closest to ground contact edges E, E. In this embodiment shown in the drawings, the center and middle circumferential grooves 6a and 6b are formed in a zigzag shape, and the shoulder circumferential grooves 6c are formed in a straight line shape. In the present invention, however, the shape, width and depth of grooves can be suitably changed without being limited to exemplified ones.

The term "ground contact edges E" as used herein denotes the axially outermost locations of a tread ground contacting region obtained when a pneumatic tire 1 in the standard state is loaded with a normal load and is brought into contact with a flat surface at a camber angle of 0°. The term "normal load" denotes a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO, provided that in case of tires for passenger cars, the "normal load" is a load of 88% of the load defined above.

The lateral grooves 7 include a plurality of center lateral grooves 7a extending across between the center circumferential grooves 6a, 6a, a plurality of first middle lateral grooves 7b extending across between the center circumferential groove 6a and the middle circumferential groove 6b, a plurality of second middle lateral grooves 7c extending across between the middle circumferential groove 6b and the shoulder circumferential groove 6c, and a plurality of shoulder lateral grooves 7d extending across between the shoulder circumferential groove 6c and the ground contact edge E. The lateral grooves 7a to 7d in this embodiment have groove walls formed into a zigzag form. The zigzag groove wall is helpful in enhancing a grip on an icy road since the length of the edges of lateral grooves 7a to 7d are increased.

In this embodiment, the tread portion 2 includes seven rows of blocks arranged in the circumferential direction, specifically a center block row BR1 in which center blocks B1 are aligned in the circumferential direction on the tire equator C, first middle block rows BR2 in which first middle blocks B2 are aligned in the circumferential direction on both sides of the center block row BR1, second middle block rows BR3 in which second middle blocks B3 are aligned in the circumferential direction on an axially outer side of each of the first middle block rows BR2, and shoulder block rows BR4 in which shoulder blocks B4 are aligned in the circumferential direction along each ground contact edge E on an axially outer side of each of the second middle block rows BR3.

The axial width BW of each of the blocks B1 to B4 (in other words, the block rows BR1 to BR4) is not particularly limited. However, if the width BW is too small, there is a possibility that the lateral rigidity is excessively lowered to deteriorate the steering stability, and if it is too large, there is a possibility that the performances on snow-covered road are deteriorated since the volume of the circumferential grooves 6 is decreased. Therefore, from such points of view, the axial width BW of each of the blocks B1 to B4 is preferably at least 16 mm, more preferably at least 20 mm, and is preferably at most 30 mm, more preferably at most 26 mm.

Figure 3:
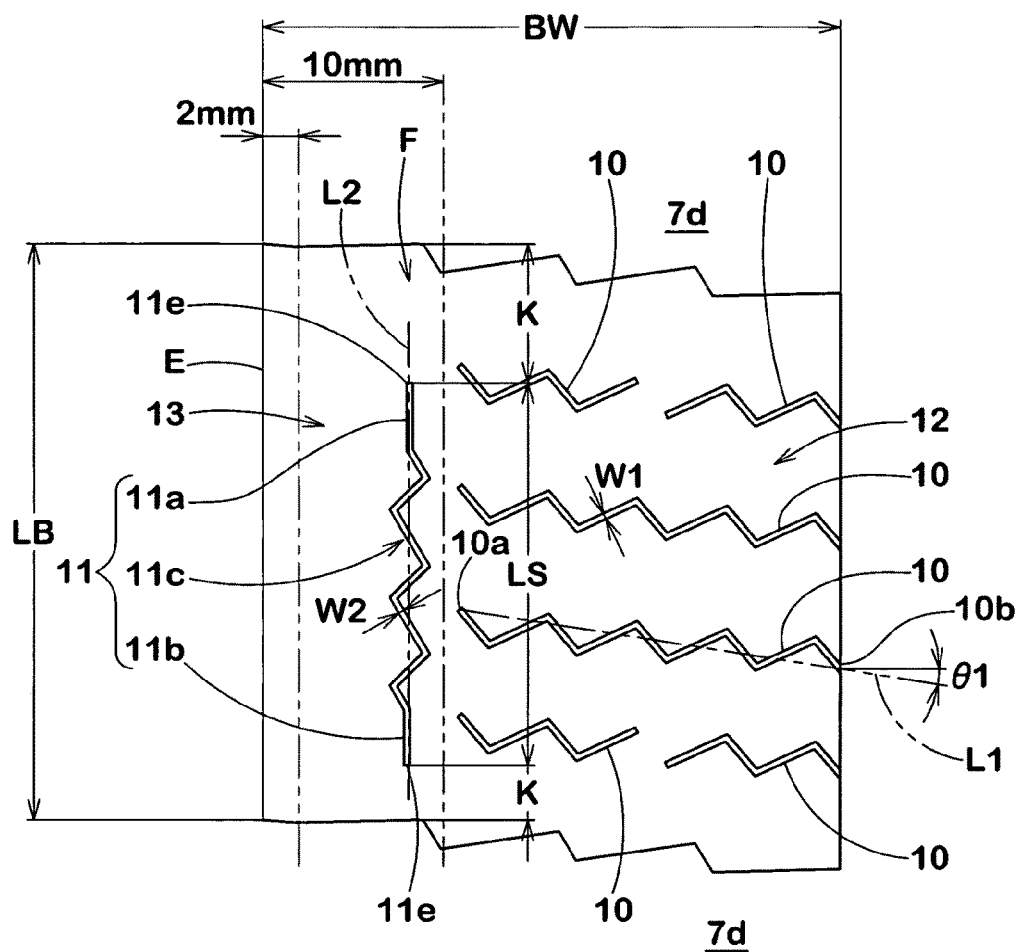
FIG. 3 is an enlarged plan view of a shoulder block.

A plurality of sipes 10 extending in the axial direction (hereinafter referred to as "axial sipes" 10) are provided in each of the blocks B1 to B4. In FIG. 3 is shown an enlarged plan view of a shoulder block B4. As shown in FIG. 3, the sipes 10 are formed as thin incisions having a narrow width W1 of about 0.5 to about 1.5 mm. The axial sipes 10 can enhance a frictional force to an icy road particularly at the time of straight running by the edges thereof, thus effectively exhibiting the driving and braking forces. In order to effectively exhibit such actions, it is preferable that the axial sipes 10 are disposed at a tilt such that the inclination angle θ1 of a straight line L1 connecting the both ends 10a and 10b of a sipe 10 with respect to the axial direction of tire is preferably at most ±20°, more preferably at most ±15°. Zigzag sipes 10 which extend axially in a zigzag form are used in this embodiment, but the sipes 10 may be formed in various forms such as wave, straight line, zigzag and combinations thereof.

As shown in FIG. 1, the pneumatic tire 1 of the present invention has square shoulders such that the outer surface 2a of shoulder blocks B4 and a buttress face 14 extending radially inwardly and axially outwardly from the ground contact edge E intersects at the ground contact edge E to form a substantial edge or corner. In other words, each of the ground contact edges E is present on an edge (a corner). Therefore, since the pneumatic tire 1 of the present invention can secure a larger ground contact width TW as compared with tires having so-called round shoulders, the ground contact area is increased to give larger driving and braking forces on an icy road.

As shown in FIG. 3, each of the shoulder blocks B4 is provided with a sipe 11 which extends in the circumferential direction (hereinafter referred to as "circumferential sipe" 11), in a region F having boundaries apart axially inwardly from each ground contact edge E by distances of 2 mm and 10 mm.

The circumferential sipe 11 in this embodiment comprises a zigzag middle portion 11c and linear end portions 11a and 11b located on the both sides of the middle portion 11c. However, the shape of the sipe 11 is not limited thereto. Similarly to the axial sipe 10, the circumferential sipe 11 is formed in the form of an incision having a width W2 of about 0.5 to about 1.5 mm. The circumferential sipe 11 serves to exhibit an edge action effective for cornering on an icy road.

In order to effectively exhibit this action, it is preferable that the inclination angle θ2 of a straight line L2 connecting the both ends 11e, 11e of the circumferential sipe 11 with respect to the circumferential direction of tire is at most ±20°, especially at most ±10°, more especially at most ±5°. Further, it is preferable, as shown in FIG. 3, that the circumferential sipe 11 is disposed so that the entire thereof is present in the region F without running out of the region F, provided that it is regarded that the state that the circumferential sipe 11 is disposed in the region F is satisfied if the straight line L2 is present within the region F without sticking out from the region F.

The shoulder block B4 is divided by the circumferential sipe 11 into a main portion 12 located axially inward of the circumferential sipe 11, and an edge portion 13 located axially outward of the circumferential sipe 11 and having a smaller axial width than that of the main portion 12. Since the edge portion 13 has a smaller width than the main portion 12, it has a small rigidity and is easy to deform when receive an external force. Therefore, the edge portion 13 flexibly deforms when coming into contact with a rut slope and serves to prevent a tire from running up on the rut slope.

If the circumferential sipe 11 is not separated from the ground contact edge E in an axially inner direction by a distance of 2 mm or more, the width of the edge portion 13 is excessively small, so the edge portion 13 is easy to cause chipping or uneven wear. On the other hand, if the axial distance of the circumferential sipe 11 from the ground contact edge E is more than 10 mm, the width of the edge portion 13 is large, so its flexible deformation is impaired to deteriorate the wandering-suppression effect.

The above-mentioned action of the edge portion 13 can be achieved even if the edge portion 13 is not completely separated from the main portion 12 by the circumferential sipe 11. However, the circumferential length LS of the circumferential sipe 11 is excessively small, the rigidity of the edge portion 13 of the shoulder block B4 can not be sufficiently decreased. Therefore, the length LS is preferably at least 50%, more preferably at least 60%, of the circumferential length LB of the shoulder block B4 measured at the ground contact edge E.

The circumferential sipe 11 may be opened to the shoulder lateral groove or grooves 7d. In this case, however, the rigidity of the edge portion 13 may be somewhat lowered. Therefore, preferably the circumferential sipe 11 is formed into a closed type that the both ends 11e of the sipe 11 are located inside the block B4 without opening to the adjacent shoulder lateral grooves 7d. In particular, from the viewpoint of preventing uneven wear from occurring at the both ends 11e of the circumferential sipe 11, the circumferential distance K between the shoulder lateral groove 7d and each end 11e of the sipe 11 is preferably at least 1 mm, more preferably at least 2 mm.

The depth SD of circumferential sipe 11 (shown in FIG. 1) is not particularly limited. However, if the depth SD is too small, there is a possibility that the edge portion 13 disappears in an early stage of use owing to wear, and if the depth SD is too large, there is a possibility that the rigidity of the shoulder blocks B4 is lowered to deteriorate the steering stability and the wear resistance. Therefore, the depth SD of circumferential sipe 11 is preferably at least 20%, more preferably at least 30%, of the depth GD of the shoulder circumferential groove 6c, and is preferably at most 80%, more preferably at most 70%, of the depth GD of the shoulder circumferential groove 6c. The depth of a groove denotes a value measured along the center line of the cross section of the groove.

Figure 4:
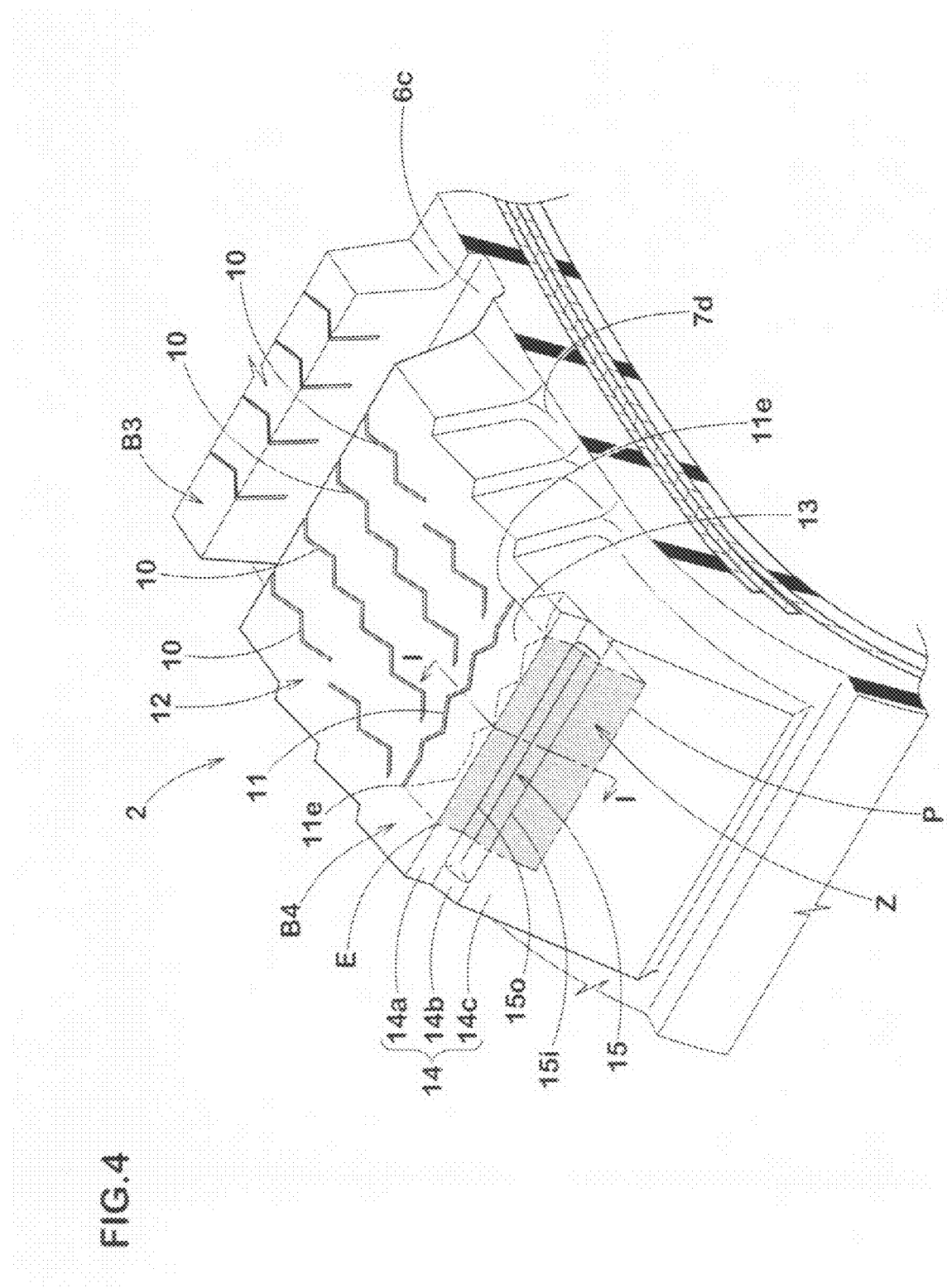
FIG. 4 is a partial perspective view of a tread portion of the tire according to the present invention.
Figure 5A:
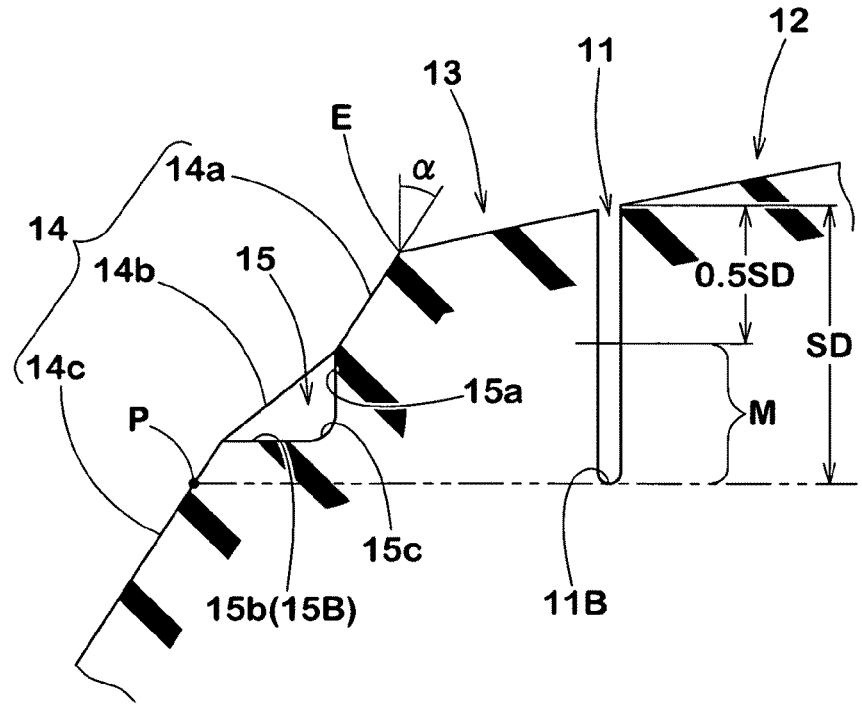
FIG. 5(*a*) is an enlarged cross sectional view taken on line I-I in FIG. 4, and FIG. 5(*b*) is an enlarged view of a part of FIG. 5(*a*)
Figure 5B:
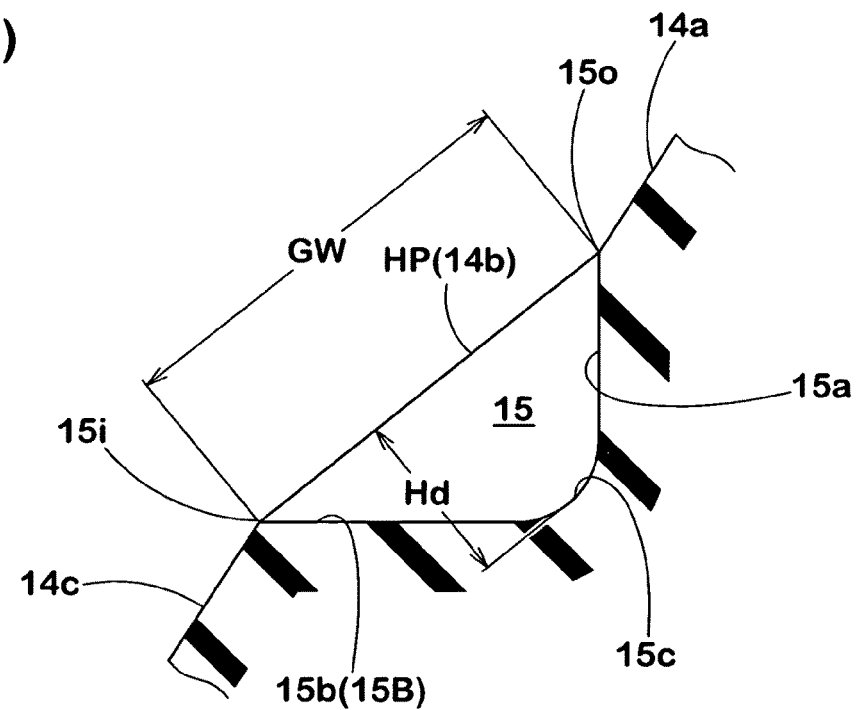

FIG. 4 shows a perspective view of a part of the tread portion 2 including a shoulder block B4 of the pneumatic tire 1. FIG. 5(a) is an enlarged cross sectional view taken on line I-I in FIG. 4, and FIG. 5(b) is an enlarged view of a part of FIG. 5(a). In this embodiment shown in the drawings, the buttress face 14 includes an outer slope 14a having an inclination extending radially inwardly and axially outwardly from the ground contact edge E (for example, at an angle α of 5 to 30° with respect to the radial direction of tire), a middle slope 14b which is continuous with the outer slope 14a and extends axially inwardly with an inclination smaller than that of the outer slope 14a with respect to the axial direction (namely at an angle larger than the angle α with respect to the radial direction), and an inner slope 14c which is continuous with the middle slope 14b and has an inclination approximately parallel to the inclination of the outer slope 14a. In this embodiment shown in the drawings, the slopes 14a and 14b are formed in a small step-like form, and the length of the slope 14c in cross section is much larger than the lengths of the slopes 14a and 14b in cross section. The lengths of the slopes 14a and 14b may be the same or different from each other. In this embodiment, the length of the slope 14b is slightly larger than the length of the slope 14a.

The pneumatic tire 1 of the present invention is provided with a recess 15 extending in the circumferential direction in the buttress face 14, specifically in at least a part of a projection region Z (gray part shown in FIG. 4) obtained by projecting a circumferential sipe 11 onto the buttress face 14 along the axial direction. The recess 15 in this embodiment shown in the drawings is disposed in the middle slope 14b of the buttress face 14 to extend circumferentially in the slope 14b. The width GW of the opening of the circumferentially long recess 15 may be the same as the length of the slope 14b in cross section as shown in the drawings, or may be smaller than the length of the slope 14b in the cross section.

The buttress face 14 is formed with a slope inclining in the radially inner direction and the axially outer direction. Therefore, the edge portion 13 of the block B4 cannot be sufficiently deformed in the axially outer direction by merely forming the circumferential sipe 11. In contrast, when the recess 15 is further provided in the above-mentioned projection region Z on the buttress face 14, the width of the bottom of a portion located axially outward of the circumferential sipe 11 can be decreased as apparent from FIG. 5(a), so the edge portion 13 can be deformed axially outwardly to a larger extent. Therefore, in the case that a lateral force to climb a slope of a rut acts on the shoulder blocks B4, the recess 15 serves as a fulcrum to flexibly and greatly deform the edge portions 13 of the blocks B4 in the axially outer direction. Camber thrust (lateral force) generating owing to a rut can be allowed to escape by the deformation of the edge portion 13, so the anti-wandering performance is greatly enhanced.

Since the circumferential sipes 11 in this embodiment have a zigzag portion 11c, the main portion 12 and edge portion 13 of a shoulder block B4 are engaged with each other at the zigzag portion 11c and accordingly can be integrally deformed in the circumferential direction. Therefore, the shoulder block B4 is more surely prevented from causing uneven wear on an edge portion 13 side.

Herein, the projection region Z is a region on the tire outer surface sandwiched between the ground contact edge E and a line P (line or location of a sipe bottom 11B of the circumferential sipe 11 projected in the axial direction onto the buttress face 14), as shown in FIG. 5(a), and has the same circumferential length LS as that of the circumferential sipe 11.

The depth Hd of the recess 15 from the buttress face 14 is from 0.5 to 3 mm. If the depth Hd is less than 0.5 mm, the edge portion 13 cannot be sufficiently deformed axially outwardly, so the wandering suppression effect is lowered. If the depth Hd is more than 3 mm, the rigidity of the edge portion 13 is easy to lower, so there is a possibility that the wear resistance is deteriorated. From such points of view, the depth Hd of the recess 15 is preferably at least 1 mm and at most 2 mm. Herein, as shown in FIG. 5(b), the depth Hd of the recess 15 is a value measured in a direction perpendicular to a plane HP connecting a radially outer edge 15o of the recess 15 and a radially inner edge 15i of the recess 15.

It is required that the recess 15 is disposed so that its radially innermost end 15B is located at a radial position corresponding to a region M ranging from 50 to 100% of the depth SD of the circumferential sipe 11. If the innermost end 15B is located at a position corresponding to less than 50% of the depth SD of the sipe 11, the rigidity of a base portion of the edge portion 13 cannot be sufficiently lowered and, therefore, a sufficient wandering suppression effect is not obtained. If the innermost end 15B position of the recess 15 is radially below the bottom 11B of the circumferential sipe 11, the amount of deformation of the edge portion 13 becomes large, so cracks are easy to generate at the sipe bottom 11B and uneven wear starting from the edge portion 13 is also easy to generate. From such points of view, it is particularly preferable that the recess 15 is disposed so that its radially innermost end 15B is located at a radial position corresponding to a region between 50% and 70% of the depth SD of the circumferential sipe 11.

The section shape of the recess 15 is not particularly limited. Preferably, the recess 15 has an approximately triangular cross section as shown in FIGS. 5(a) and 5(b). In a meridian section of tire, this recess 15 comprises a vertical plane 15a extending from the buttress face 14 in a radially inward direction at an angle within the range of ±10° with respect to the radial direction, a horizontal plane 15b located at a position radially inward of the vertical plane 15a and extending from the buttress face 14 in an axially inward direction at an angle within the range of ±10° with respect to the axial direction, and a circular arc plane 15c connecting the vertical plane 15a and the horizontal plane 15b with a smooth circular arc. In the embodiment shown in the drawings, the horizontal plane 15b provides the radially innermost end 15B of the recess 15 or the radially innermost end position.

The vertical plane 15a extends approximately parallel to the circumferential sipe 11, whereby a base portion of the edge portion 13 has substantially a constant width and its rigidity is surely lowered. Thus, the edge portions 13 of the shoulder blocks B4 are sufficiently deformed when running on a rutted road to surely exhibit the wandering suppression effect. If the angle of the vertical plane 15a is more than +10° with respect to the radial direction (wherein "+" means a counterclockwise direction and, for example, a vertical plane having an inclination of +10° means a plane inclined radially inwardly and axially inwardly at an angle of 10° with respect to the radial direction), there is a possibility that the rigidity of the edge portions 13 is excessively lowered and accordingly chipping and uneven wear are easy to occur. If the angle of the vertical plane 15a is less than −10°, the wandering suppression effect is decreased since the rigidity of the edge portions 13 is not sufficiently lowered.

The horizontal plane 15b provides a sufficient space for deformation so as not to hinder the edge portion 13 from deforming axially outwardly. Therefore, camber thrust generating when running on a rutted road can be allowed to surely escape. Further, since the horizontal plane 15b is continuous with the inner slope 14c of the buttress face 14 and since the rubber thickness of the inner slope 14c is much larger than the rubber thickness of the outer slope 14a, damage of the circumferential sipe 11 at its bottom 11B can be effectively prevented from occurring.

If the angle of the horizontal plane 15b is more than +10° with respect to the axial direction (wherein "+" means a counterclockwise direction and, for example, a horizontal plane having an inclination of +10° means a plane inclined radially outwardly and axially inwardly at an angle of 10° with respect to the axial direction), there is a possibility that the rigidity of the edge portions 13 is easy to lower and an appropriate stress concentration does not occur at an intersecting portion (circular arc plane 15c) between the vertical plane 15a and the horizontal plane 15b. If the angle of the horizontal plane 15b is less than −10° (wherein "−" means a clockwise direction and, for example, a horizontal plane having an inclination of −10° means a plane inclined radially inwardly and axially inwardly at an angle of 10° with respect to the axial direction), there is a possibility that the above-mentioned space for allowing the edge portion 13 to deform axially outwardly is decreased. Further, if the angle of the horizontal plane 15b is outside the above range, camber thrust is prevented from escaping.

The circular arc plane 15c of the recess 15 serves to effectively prevent a stress from concentrating at the intersecting portion between the vertical and horizontal planes 15a and 15b and accordingly can prevent occurrence of cracks or the like over a long term.

The recess 15 shown in this embodiment has a circumferential length larger than the circumferential length LS of the circumferential sipe 11. Further, each of the both ends 15e of the recess 15 is located at a circumferential position between each end 11e of the circumferential sipe 11 and the shoulder lateral groove 7d closest to the end 11e (in other words, at a position between each of the circumferential edges of the projection region Z and the adjacent shoulder lateral groove 7d). Such a recess 15 more surely render a base portion or root portion of the edge portion 13 of the shoulder block B4 flexible and, therefore, can further enhance the wandering suppression effect. However, either one end 15e or both ends 15e may be located within the projection region Z.

Figure 6:
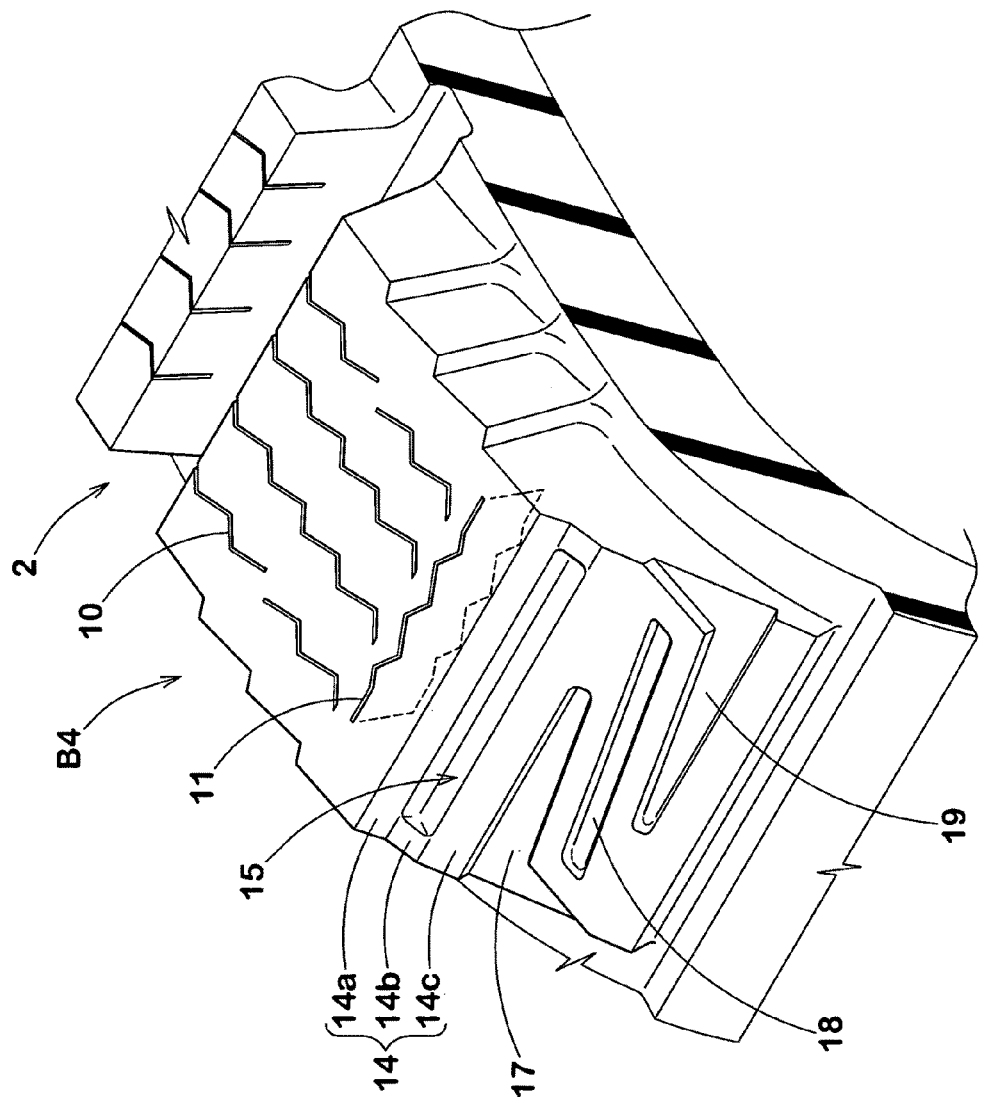
FIG. 6 is a partial perspective view of a tread portion of a pneumatic tire illustrating another embodiment of the present invention.
Figure 7:
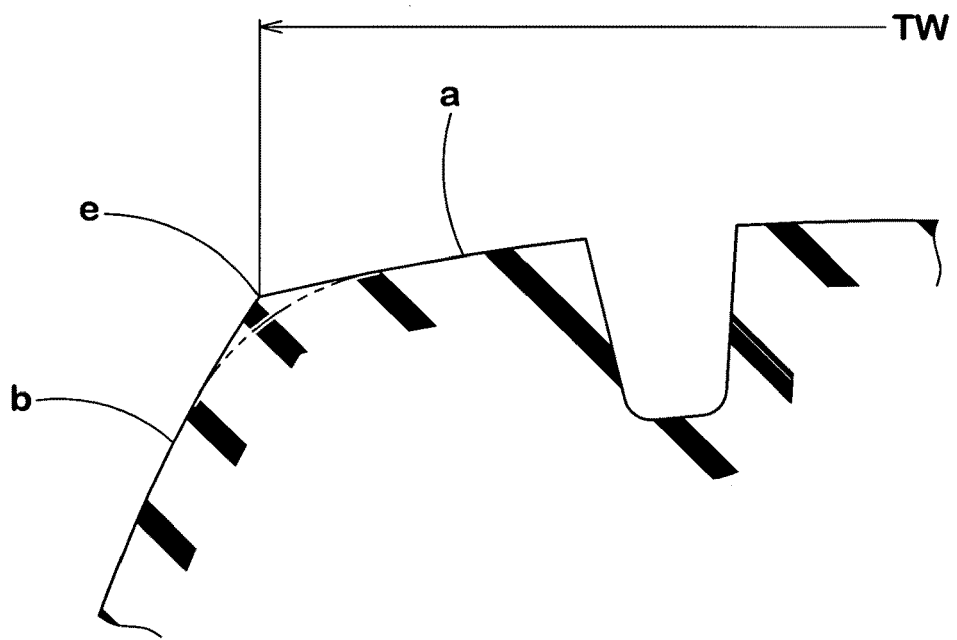
FIG. 7 is a cross sectional view for illustrating a square shoulder of a tread portion as seen in a known pneumatic tire.

While an embodiment of the present invention has been described with reference to the drawings, it goes without saying that the present invention is not limited to only such an embodiment and various changes and modifications may be made. For example, as shown in FIG. 6, at least one of circumferential grooves 17 to 19 of various shapes which serve to lower the rigidity of the buttress face 14 may be provided in the buttress face 14 (in the embodiment shown in the drawing, in the inner slope 14c of the buttress face 14).

The present invention is more specifically described and explained by means of the following examples. It is to be understood that the present invention is not limited to these examples.

EXAMPLES

Test tires (Examples and Comparative Examples) having a basic structure shown in FIGS. 1 to 5 were manufactured based on specifications shown in Table 1. The anti-wandering performance, wear resistance and TGC performance of the tires were evaluated. Specifications common to all tires are as follows:

Width BW of shoulder block: 25 mm
Length LB of shoulder block: 31.8 to 39.3 mm (pitch variation)
Depth GD of shoulder circumferential groove: 9.9 mm
Width of shoulder circumferential groove: 6.9 mm
Depth SD of circumferential sipe: 5.0 mm
Width W2 of circumferential sipe: 0.3 mm
Length LS of circumferential sipe: 17.9 to 21.9 mm (pitch variation)

Testing methods are as follows:

<Anti-Wandering Performance>

The tires were attached to a 2,000 cc FR car, and the car was run on rutted icy and snow-covered roads. The anti-wandering performance was evaluated by a driver's feeling. The evaluation was made by a ten point method. The larger the value, the better the anti-wandering performance. The testing conditions are as follows:
Tire size: 195/65R15
Rim: 6.5×15
Inner pressure of tire: 200 kPa <Wear Resistance>

The test car mentioned above was run 8,000 km on a dry asphalt road. The amount of wear of shoulder blocks was measured. The results are shown as an index based on the result of Comparative Example 2 regarded as 100. The larger the value, the better the wear resistance.

<TGC Performance>

The tire was run on a drum tester while blowing air containing 50 pphm of ozone (500 L/H), and the state of the recess (presence of cracks) was visually observed. The testing conditions are as follows:
Rim: 6.5×15
Inner pressure of tire: 200 kPa
Load: 6.96 kN
Speed: 80 km/hour
Running time: 200 hours The results are shown in Table 1.

It is observed in the table that the tires of the Examples according to the present invention are improved in anti-wandering performance without deteriorating the wear resistance as compared with tires of the Comparative Examples.

TABLE 1

|  | Com. Ex. 1 | Com. Ex. 2 | Ex. 1 | Com. Ex. 3 | Ex. 2 | Com. Ex. 4 | Com. Ex. 5 |
|---|---|---|---|---|---|---|---|
| Position of circumferential sipes (distance between straight line L2 and ground contact edge E) (mm) | 1.5 | 10.5 | 5.0 | 5.0 | 5.0 | 5.0 | 5.0 |
| Depth Hd of recess (mm) | 1.5 | 1.5 | 1.5 | 0.4 | 3.5 | 1.5 | 1.5 |
| Position of innermost end of recess to depth SD of circumferential sipes (%) | 60 | 60 | 60 | 60 | 60 | 40 | 110 |
| Angle of vertical plane of recess (degree) | 0 | 0 | 0 | 0 | 0 | 0 | 0 |
| Angle of horizontal plane of recess (degree) | 90 | 90 | 90 | 90 | 90 | 90 | 90 |
| Radium of curvature of arc plane of recess (mm) | 0.5 | 0.5 | 0.5 | 0.5 | 0.5 | 0.5 | 0.5 |
| Anti-wandering performance (1-to-10 scale) | 7 | 5 | 6 | 5 | 7 | 5 | 7 |
| Wear resistance (index) | 90 | 100 | 100 | 100 | 95 | 100 | 90 |
| TGC performance | good | good | good | good | good | good | cracking |

What is claimed is:

1. A pneumatic tire comprising: a tread portion having a row of shoulder blocks which are aligned along a ground contact edge and which are defined by a circumferential shoulder groove extending continuously in the circumferential direction of the tire on a side closest to a ground contact edge and a plurality of lateral shoulder grooves extending from said circumferential shoulder groove to the ground contact edge, wherein said pneumatic tire has a square shoulder such that a radially outer surface of each said shoulder block intersects, at said ground contact edge, with a buttress face extending radially inwardly and axially outwardly to form a substantial edge substantially an edge, and each said shoulder block provided with a circumferential sipe extending in the circumferential direction in a region ranging from a distance of 2 mm or more axially inwardly from said ground contact edge to a distance of 10 mm or less axially inwardly from said ground contact edge, said buttress face is provided with a recess extending in the circumferential direction and having a depth of 0.5 to 3 mm measured from said buttress face in at least a part of a projection region obtained by projecting each said circumferential sipe onto said buttress face along the axial direction of the tire so that, the radially innermost end of said recess is located in a region ranging from 50 to 100% of the depth of said circumferential sipe, and wherein said buttress face includes an outer slope extending radially inwardly and axially outwardly from said ground contact edge, a middle slope which is continuous with said outer slope and extends radially inwardly from the outer slope with an inclination smaller than that of the outer slope, and an inner slope which is continuous with said middle slope and extends from the middle slope substantially parallel to the outer slope, and said recess is disposed in said middle slope.

2. The pneumatic tire according to claim 1, wherein in a meridian section of the tire including rotational axis of a the tire in an unloaded standard state that the tire is mounted on a standard rim and inflated to a normal inner pressure, said recess has a substantially triangular cross section comprising a vertical plane extending from said buttress face in a radially inward direction at an angle within ±10° with respect to the radial direction of the tire,
- a horizontal plane located radially inward of said vertical plane and extending from said buttress face in an axially inward direction at an angle within ±10° with respect to the axial direction of the tire, and
- an arc plane joining said vertical and horizontal planes with a smooth arc.

3. The pneumatic tire according to claim 1, wherein said circumferential sipe is located within the shoulder block without opening to the adjacent lateral shoulder grooves at its both circumferential ends.

4. The pneumatic tire according to claim 3, wherein said recess has a circumferential length larger than that of said circumferential sipe and is located in said buttress face without opening to the adjacent lateral shoulder grooves at its both circumferential ends, and
- each of the circumferential ends of the recess is arranged between the end of said circumferential sipe and the adjacent lateral shoulder groove located on the side closer to it.

* * * * *